United States Patent Office 2,965,489
Patented Dec. 20, 1960

2,965,489

STABILIZED LIQUID ANIMAL AND POULTRY FOOD SUPPLEMENT

Forest H. Clickner, Mendota, Ill., assignor to Soluble Nutrients, Inc., Chicago, Ill., a corporation of Illinois No Drawing. Filed Dec. 26, 1957, Ser. No. 705,114

7 Claims. (Cl. 99—9)

The present invention relates to preservation of food and in particular relates to the product and methods for preserving whole broth of fermentation products and fermentable solutions.

It has become generally known that live stock are greatly improved in their health and rate of growth when fed with high vitamin diet. It has also been observed that the fluid fermentation products from fresh whole fermentation broth derived as a by-product from processes such as brewing, cheese making and certain other food refining industries contain substances with growth stimulating factors not due to the known vitamins in their dehydrated and concentrated form. It has been the general practice in food processing industries such as brewing, sugar refining, cheese making and others to discard the fluid fraction of fermentation broths or to feed it in fresh form to live stock, kept conveniently close to the plant where it was produced. Fermentable broths are notoriously difficult to store; bacterial and enzymatic action at normal summer temperatures produces rapid and uncontrolled biological reactions which result in making fermentable broths unfit even for animal consumption. Accordingly, most of these fermentation broths are now disposed of as waste or concentrated by dehydration into non-viable products because of the difficulties of storing them in viable forms and shipping them in a viable state for later feeding to live stock.

I have invented an improvement process for preserving at ambient temperatures whole fermentation broths including the fluid fractions. My process controls the multiplication and development of aerobic bacterial mold and fungus found on the surface of fermentation solutions and anaerobic bacteria, yeast, and mold found in the interior and lower portions of fermented broths.

One object of my invention is to provide a whole fermentation broth adjusted to avoid spoilage at ambient temperature for an indefinite period of time suitable for poultry and animal food supplements.

Another object of my invention is to provide whole broth fermentation products in aqueous solutions with the enzymatic fractions intact and available for use as an animal and poultry food supplement.

Another object of my invention is to provide a method of preparing an animal and poultry food supplement enriched in the known vitamins and further enriched with the enzymatic and fermentation product residues of food processing industries.

Still another object of my invention is to provide a live stock food supplement containing vitamins, fermentation products, minerals, and high caloric fractions of food processing industry by-products in a convenient aqueous solution which may be added to the normal grain and fodder live stock feeds without risk of loss in the live stock feeding yard and in a form which assures equal distribution of the food supplement to each individual animal.

These and other objects and advantages of my invention will appear from the following specification and claims.

My invention comprises briefly a viable yet stable animal food supplement product comprising a mixture of whole fermentation broth, whole vitamin broth, saccharides of sugars, and acid, the sugar and acid being added to adjust the pH to between 4.00 to 5.80 and the osmotic pressure between 85 to 100 atmospheres. My invention further comprises the process of stabilizing the biological activity of viable whole fermentation broth at ambient temperatures by means of adjusting the pH to between 4.00 and 5.80 with the addition of acid and the osmotic pressure to between 85 and 100 atmospheres by the addition of non-polar water soluble non-toxic substances.

A typical embodiment of my invention is described in the following table:

I

Whole fermentation broth _____ percent [1] __ 12 to 40
Sugar syrup (unrefined) _____ do____ 55 to 78
Vitamin $B_2$, $B_{12}$ broth_____ do____ 1 to 15
Acid (phosphoric or lactic) pH _____ 4.00 to 5.80
    Preferably adjusted to near 4.5 pH.
Osmotic pressure adjusted by the addition of
    the sugar fraction to between 85 and 100 atmospheres.
    Preferably near 90 atmospheres.
Vitamin additives in quantities sufficient to assure pre-selected concentrations.

[1] Percentage by volume.

The whole fermentation broth may be selected from such end products in fermentation processes as wort water derived from beer manufacturing, whey from cheese making, fish solubles and stick water from fish and meat packing processes. It is practical to mix these fermentation products and fermentable solutions and utilize the resulting mixture of viable nutrient solutions in my invention. The sugar syrup may be any unrefined sugar containing a solution such as derived from various steps in the processing of corn, beet and cane sugars as well as certain fruit packing and preserving processes. Vitamins $B_2$ and $B_{12}$ are available in economically inexpensive form as whole broth. I have found that the vitamin broth can be utilized in my invention thus saving the added cost of utilizing the refined vitamin concentrates. Some vitamins such as niacin and choline chloride are inexpensive in the concentrated form and may be added in that form to my product.

My stabilized fermentation broth is prepared by mixing the fermentation and fermentable broths; adding sugar syrup to adjust the osmotic pressure to between 85 and 100 atmospheres, preferably near 90 atmospheres in most embodiments; and the addition of acid to adjust the pH of the mixture of between 4.00 and 5.80, but preferably near 4.5 in most embodiments.

The pH of the solution is readily measured by using a standard pH meter with glass electrodes or by using standard indicator solutions. The osmotic pressure is apparent osmotic pressure computed from dialysis rates through regenerated cellulose membranes of preparations immersed in aqueous solutions of glucose at 50° F. for 24 hours.

Stabilized fermentable broths prepared according to my process as described above may be stored indefinitely at ambient temperatures with substantially no continued biological activity or deleterious enzymatic reactions, yet all the while remaining in a viable condition. The addition of water and appropriate ambient temperature revive the latent bacteria, molds and fungi whereupon fermentation will again be initiated.

My stabilized and enriched fermentation broths are utilized by spraying them onto dried grain fodder prior to feeding, placing them in water in preparation for feeding to live stock, or feeding them directly to live stock in the stabilized form.

The following six (6) tables give specific embodiments of stabilized and biologically controlled viable fermentation broth mixtures which carry whole fermentation broth food fractions suitable for animal feed:

II

| | |
|---|---|
| Wort water | percent[1] 13 |
| Hydrol | do 59 |
| Corn steep liquor | do 14 |
| $B_2$, $B_{12}$ vitamin whole broth | do 14 |
| | do 100 | pH ---- 4.38
O.P. ---- atmospheres ---- 98

Stability:
Room temperature. 0.1 ml. gas evolution[2] after 10 days from 8-ml. sample.
120–125° F. 1.0 ml. gas evolution after 10 days from 8-ml. sample.

[1] Note all percentages in these tables refer to percent by volume.
[2] Gas pressures are given in terms of standard temperature and pressure conditions.

III

| | |
|---|---|
| Wort water | percent 16 |
| Hydrol | do 68 |
| B vitamin | do 16 |
| | do 100 | pH ---- 5.78
O.P. ---- atmospheres ---- 88

Stability:
Room temperature. No measurable gas from 8-ml. sample after 10 days.
120–125° C. 0.1 ml. gas evolution from 8-ml. sample after 10 days.

IV

| | |
|---|---|
| Wort water | percent 15 |
| Hydrol | do 64 |
| Corn steep liquor | do 6 |
| Vitamin broth B complex | do 15 |
| | do 100 | pH ---- 4.95
O.P. ---- atmospheres ---- 92

Stability:
Room temperature. No measurable gas evolution after 10 days.
120–125° F. 0.6 ml. gas evolution from 8-ml. sample after 10 days.

V

| | |
|---|---|
| Wort water | percent 14 |
| Hydrol | do 62 |
| Corn steep liquor | do 10 |
| Vitamin B broth | do 14 |
| | do 100 | pH ---- 4.49
O.P. ---- atmospheres ---- 97

Stability:
Room temperature. 0.1 ml. gas evolution from 8-ml. sample after 10 days.
120–125° F. 1.3 ml. gas evolution from 8-ml. sample after 10 days.

VI

| | |
|---|---|
| Wort water | percent 17.2 |
| Vitamin $B_2$, $B_{12}$ broth | do 6.4 |
| 40% solids whey | do 20.1 |
| Corn molasses | do 56.3 |
| | do 100.0 |

Stability upon standing in room temperature good after 20 days.

Added vitamin materials to standardize the vitamin potency of the final product:

| | |
|---|---|
| Riboflavin | mg./# 75 |
| Pantothenic acid | mg./# 75 |
| Niacin | mg./# 250 |
| Choline chloride | mg./# 2000 |
| $B_{12}$ | mg./# .15 |

VII

| | Percent |
|---|---|
| Whey | 19.0 |
| Wort water | 15.4 |
| Corn syrup molasses | 60.7 |
| Riboflavin broth (36 mg./gal.) | 1.5 |
| $B_{12}$ broth (36 mg./gal.) | 3.4 |
| | 100.0 |

Phosphoric acid added to adjust pH to 4.55.

My stabilized fermentation solution may be stored in conventional tanks or drums; it may be shipped without refrigeration or other special precautions conventional in the food shipment industry. Moreover, it may be stored in its stabilized form for extended periods prior to use without apparent loss of food value. Once the osmotic pressure and/or pH value of the stabilized solution is altered by the addition of water or by mixing the stabilized solutions into dried grains the biological activity may be resumed. Accordingly, stabilized fermentation broth should be fed within a few hours after the stabilizing conditions of acid-base relationships and osmotic pressure have been altered in a manner which revise the latent biological activity.

One exception to this practice has been made in the preparation of certain dried feeds, particularly useful for poultry. The stabilized fermentation solutions are sprayed in measured quantities on the dried grain feeds. The water content of the grain thus treated is controlled to avoid extreme drying but yet the water content is kept sufficiently low to avoid resumption of the fermentation activity in the viable broth fraction which has been added to the grain. In so doing the viable fractions of the broth are not destroyed. Utilized this way it has been found the food values of the whole fermentation broth may be conveyed to poultry in a convenient form.

Feeding tests have been conducted with the objective of comparing the efficiency as a food of whole fermentation broths with other conventional foods in poultry and animal feeding. These tests consistently have shown that there is a food value in viable whole fermentation broth which is not preserved in the dried fermentation broth products. The poultry and animals fed with viable fermentation broth products showed more consistent and larger weight gains than control animals fed identical diets using the same fermentation broth but in a dried non-viable form.

The foregoing examples and embodiments of my invention are intended for illustrative purposes only; the scope and limitations of my invention are stated in the following claims.

I claim:

1. A viable stabilized animal food composition comprising whole fermentable broth mixed with non-polar, non-toxic water soluble carbohydrates in sufficient quantity to increase the osmotic pressure to more than 85 and less than 100 atmospheres, and sufficient non-toxic water soluble acid to adjust the pH value to between 4.00 and 5.85.

2. A viable stable animal feed composition comprising whole fermentable broth, saccharides added in sufficient quantity to adjust the osmotic pressure of the mixture to between 85 and 100 atmospheres, and acid water solution added in sufficient quantity to adjust the pH of the mixture to between 4.00 and 5.85.

3. A viable stable animal feed composition comprising between 12 and 40 parts by volume fermentation whole broth, between 1 and 15 parts by volume vitamin $B_2$ and $B_{12}$ whole broth, sufficient non-polar water soluble carbohydrates to adjust the osmotic pressure to a value between 85 and 100 atmospheres and sufficient non-toxic acid water solution to adjust the pH value to between 4.00 and 5.80.

4. A stabilized viable water solution of whole fermentation broth suitable for animal feed comprising between 12 and 40 parts by volume whole fermentation broth, between 1 and 15 parts by volume vitamins $B_2$ and $B_{12}$ mixed whole broth, unrefined water soluble sugar syrup added in sufficient quantity to adjust the osmotic pressure to between 85 and 100 atmospheres and sufficient water solution of acid to adjust the pH to between 4.00 and 5.80.

5. The process of stabilizing whole fermentable broth solutions in viable form comprising the steps of adjusting the osmotic pressure of the mixture to between 85 and 100 atmospheres by the addition of water solution of sugar syrup, and adjusting the pH of the mixture by the addition of acid to a value between 4.00 and 5.80.

6. A viable stable animal food composition comprising 13% by volume wort water, 59% concentrated water soluble corn syrup, 14% corn steep liquor, 14% vitamins $B_2$ and $B_{12}$ mixed whole broth and sufficient lactic acid in water to adjust the pH to 4.38, the corn sugar syrup being of sufficient concentration to raise the osmotic pressures to not less than 98 atmospheres.

7. A viable stable animal food composition comprising 17.2% by volume wort water, 20.1% by volume of 40% solids whey, 6.4% mixed whole vitamin $B_2$ and $B_{12}$ broth, and 56.3% by volume corn sugar syrup of sufficient concentration to adjust the osmotic pressure to not less than 88 atmospheres and sufficient phosphoric acid in water to adjust the pH to 5.78.

References Cited in the file of this patent

UNITED STATES PATENTS

| | | |
|---|---|---|
| 2,158,043 | Grelck | May 9, 1939 |
| 2,235,613 | Grelck | Mar. 18, 1941 |

FOREIGN PATENTS

| | | |
|---|---|---|
| 16,310 | Great Britain | 1902 |